US005349733A

United States Patent [19]

Mellits et al.

[11] Patent Number: 5,349,733

[45] Date of Patent: Sep. 27, 1994

[54] BRAKE SPRING SERVICE TOOL

[75] Inventors: Kirk E. Mellits, Racine; Dean J. Iwinski, Muskego, both of Wis.

[73] Assignee: Snap-on Incorporated, Kenosha, Wis.

[21] Appl. No.: 104,648

[22] Filed: Aug. 11, 1993

[51] Int. Cl.⁵ .............................................. B23P 19/04

[52] U.S. Cl. .............................................. 29/227; 29/450

[58] Field of Search .............. 29/173, 227, 239, 281.1, 29/446, 450, 559; 81/3.7, 485, 486, 487; 254/10.5

[56] References Cited

U.S. PATENT DOCUMENTS

| | | | |
|---|---|---|---|
| 1,533,994 | 4/1925 | Klingbeil | 81/3.7 |
| 1,558,485 | 10/1925 | Klingbeil | 81/3.7 |
| 2,244,824 | 6/1941 | Caminez | 29/227 X |
| 2,465,030 | 3/1949 | Myers | 29/227 |
| 2,589,042 | 3/1952 | Brenneman | 29/227 |
| 2,617,180 | 11/1952 | Wilkerson | 29/227 |
| 2,685,731 | 8/1954 | Vertin | 29/227 |
| 3,348,293 | 10/1967 | Newton et al. | 29/227 X |
| 3,946,987 | 3/1976 | Shultz | 29/227 X |
| 4,807,488 | 2/1989 | McManus | 29/227 X |
| 4,980,959 | 1/1991 | Czarnowski | 29/227 X |

FOREIGN PATENT DOCUMENTS

| | | | |
|---|---|---|---|
| 1727983 | 4/1992 | U.S.S.R. | 29/227 |

*Primary Examiner*—Mark Rosenbaum
*Assistant Examiner*—S. Thomas Hughes
*Attorney, Agent, or Firm*—Emrich & Dithmar

[57] ABSTRACT

A tool includes a solid block body unitary with a plurality of equidistantly spaced-apart blades which project from the body in the same direction, each blade having flat planar opposed faces with the faces of all of the blades being parallel to one another. The faces of each blade are chamfered at the distal ends thereof and are spaced apart by a pair of opposed parallel side surfaces, each inclined to the planes of the faces at an angle which approximates the complement of the helix angle of an associated spring, to facilitate insertion of the blades between the spring convolutions when the spring is extended, to maintain it in its extended condition.

13 Claims, 1 Drawing Sheet

BRAKE SPRING SERVICE TOOL

BACKGROUND OF THE INVENTION

1. Field of the Invention

The present invention relates to tools for automotive service and, in particular, to tools for facilitating servicing of spring-loaded parts. The invention has particular application to tools for maintaining a helical spring in an axially extended condition.

2. Description of the Prior Art

Various types of tools are known to facilitate the spreading or axial extension of helical tension springs. One type of tool, usable with healthy duty springs, comprises a plurality of wedges, ganged for being simultaneously driven between the convolutions of the spring to force them apart. Another type of tool, typically used for smaller springs, involves a hook-type device which is adapted to engage one end of the spring and pull or push it to an extended condition, the tool then being engageable with the opposite end of the spring to hold it in the extended condition.

Another type of tool is designed to hold a spring in an axially extended condition once it has been extended. Such a tool is disclosed, for example, in U.S. Pat. No. 2,589,042, and includes a part-cylindrical sleeve adapted to encompass the spring substantially coaxially therewith, the device having plate-like webs adjacent to its opposite ends, inclined slightly to the axis of the cylinder at approximately the helical angle of the spring, and insertable between spring convolutions adjacent to the ends of the spring to prevent it from contracting. But this device has a movable latch to hold it on the spring and requires access to substantially the entire circumference of the spring.

SUMMARY OF THE INVENTION

It is a general object of the invention to provide an improved tool for maintaining a helical spring in an axially extended condition, which tool avoids the disadvantages of prior tools while affording additional structural and operating advantages.

An important feature of the invention is the provision of a tool of the type set forth which is portable, lightweight and manually operable.

Another feature of the invention is the provision of a tool of the type set forth which is of simple and economical construction.

These and other features of the invention are attained by providing a tool for maintaining in an axially extended condition a helical spring including a wire of a predetermined thickness coiled into a plurality of convolutions with a predetermined helix angle, the tool comprising: a body including at least three elements substantially equidistantly spaced apart along an axis by a distance at least as great as the predetermined thickness of the spring wire, each of the elements being inclined at substantially the predetermined helix angle with respect to the axis, whereby the elements are disposable alternately between convolutions of the spring when it is in its axially extended condition to prevent contraction thereof.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

DESCRIPTION OF THE PREFERRED EMBODIMENTS

Figure 1:
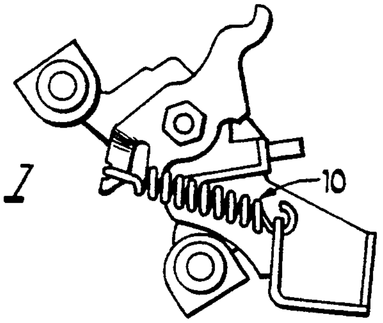
FIG. 1 is a fragmentary perspective view of an automotive brake assembly including a helical tension spring of the type with which the present invention may be used.
Figure 5:
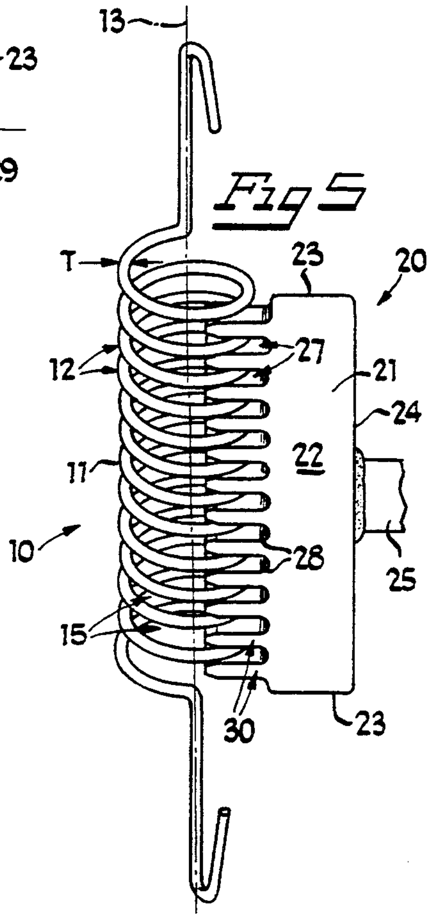
FIG. 5 is an enlarged view of the spring of FIG. 1 disposed in an axially extended condition and illustrating use of the tool of FIG. 2.

Referring to FIG. 1, there is illustrated a portion of an automotive brake assembly including a helical coil spring 10 of the type with which the present invention is intended to be used. Referring also to FIG. 5, the spring 10 is formed of a continuous wire 11 which is coiled into a plurality of convolutions 12 around a longitudinal axis 13. The wire 11 has a thickness T and the convolutions are generally inclined with respect to the axis 13 at a predetermined helix angle, all in a known manner. The spring 10 is illustrated as being a tension spring and the present invention is primarily intended for use with tension springs, but it will be appreciated that the invention could also be used with compression springs to prevent them from being compressed. When the spring 10 is placed under tension it is axially extended (see FIG. 5), opening spaces 15 between the convolutions 12, all in a known manner, the width of the spaces 15 varying with the amount of tension placed on the spring 10.

Figure 2:
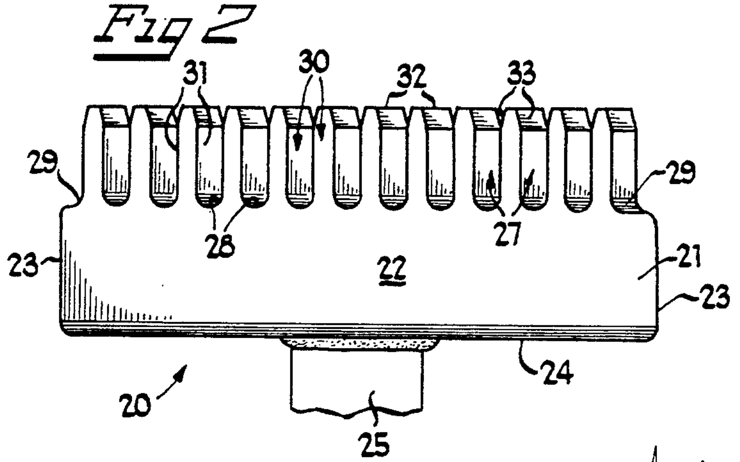
FIG. 2 is a fragmentary front elevational view of a tool constructed in accordance with and embodying the features of a first embodiment of the present invention.
Figure 4:
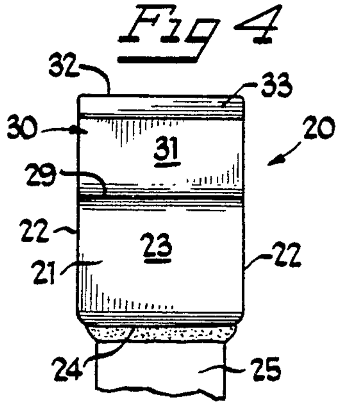
FIG. 4 is a fragmentary end elevational view of the tool of FIG. 2.
Figure 3:
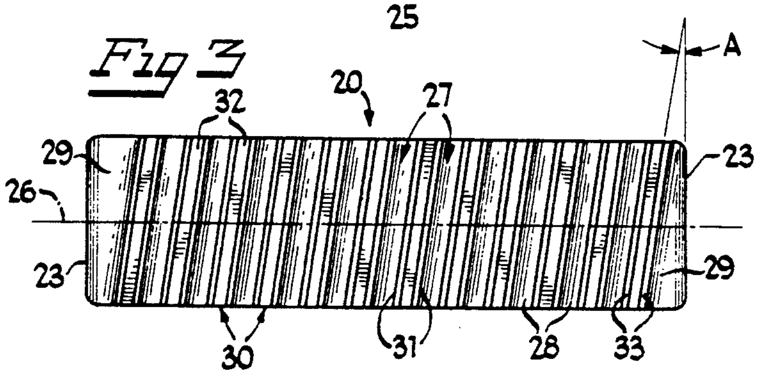
FIG. 3 is a top plan view of the tool of FIG. 2.

Referring now also to FIGS. 2–4, there is illustrated a tool 20, constructed in accordance with and embodying the features of a first embodiment of the present invention. The tool 20 has a solid body 21 in the form a rectangular block, preferably formed of a suitable metal, such as a suitable steel. The body 21 has a pair of elongated parallel side surfaces 22 interconnected at the ends of the body 21 by parallel end surfaces 23 and at the rear of the body 21 by a flat planar rear surface 24. An optional handle 25 may be provided centrally of the rear surface 24 and projecting rearwardly therefrom. The body 21 has a longitudinal axis 26 and the handle 25 is preferably disposed substantially perpendicular to the axis 26.

Formed in the front surface of the body 21 opposite the rear surface 24 are a plurality of equal-size and equidistantly spaced-apart slots 27, each extending substantially the same depth into the body 21 and terminating at an arcuate inner end 28 having a diameter which is preferably slightly greater than the thickness T (FIG.

5) of the spring wire 11 with which the tool 20 is to be used. The end ones of the slots 27 intersect the end surfaces 23 of the body 21 and define end recesses 29 in the end surfaces 23. Each of the slots 27 extends all the way across the entire thickness of the body 21 from one to the other of the side surfaces 22 and is inclined with respect to a perpendicular to the axis 26 at an angle A (FIG. 3) which approximates the helix angle of the spring 10.

It can be seen that the slots 27 and the end recesses 29 cooperate to define a plurality of equal-thickness and equidistantly spaced-apart blades 30, each having parallel side surfaces or faces 31 and a distal end surface 32, such that the side surfaces 31 of all of the blades 30 are substantially parallel to each other, and the end surfaces 32 of all of the blades 30 are substantially coplanar. Preferably, each of the blades 30 has chamfers 33 formed adjacent to the distal ends of the side surfaces 31, converging at a predetermined chamfer angle to the associated end surfaces 32. Thus, it will be appreciated that the blades 30 all have a predetermined thickness and are spaced apart a distance at least as great as the thickness T of the spring wire 11, and the faces 31 are inclined with respect to the axis 26 and the side surfaces 22 at a predetermined non-orthogonal angle, such that the blades 30 are inclined to a perpendicular to the axis 26 at substantially the helix angle of the spring 10. Furthermore, it will be noted that each of the blades 30 has a length from the end surface 32 to the deepest part of the curved end 28 of the adjacent slots 27 which is preferably slightly less than half of the total width of the body 21 from the end surfaces 32 to the rear surfaces 24, as can best be seen in FIGS. 2 and 4. Each blade 30 also preferably has a width slightly greater than its length, as can be seen in FIG. 4. In the preferred embodiment, the angle A is in the range of from about 5° to about 20° and is preferably substantially 9°. Thus, the angle between the blades 30 and the axis 26 is between 70° and 85° and preferably substantially 81°.

Referring to FIG. 5, in operation, when the spring 10 has been axially extended under tension, the blades 30 of the tool 20 are manually inserted respectively in the spaces 15 between adjacent convolutions 12 of the spring 10. The inclination of the blades 30 with respect to the axis 26 will facilitate this insertion, as will the chamfers 33. Preferably, the length of the blades 30 is at least half the diameter of the spring 10. It will be appreciated that, when the spring 10 is released, it will be prevented from returning to its fully compressed normal condition by the blades 30. Preferably, the number of blades 30 is substantially as great as the number of convolutions 12 of the spring 10. In any event, the number and length of the blades 30 must be sufficient to prevent the spring from buckling or relaxing. Thus, the tool 20 provides a safe and easy method for removing and installing the spring 10 and for servicing associated parts, such as parts of an automotive brake assembly. When servicing is completed, the spring 10 is again subjected to a tension sufficient to release the gripping force of the convolutions 12 on the blades 30 and the tool 20 is then removed.

Figure 6:
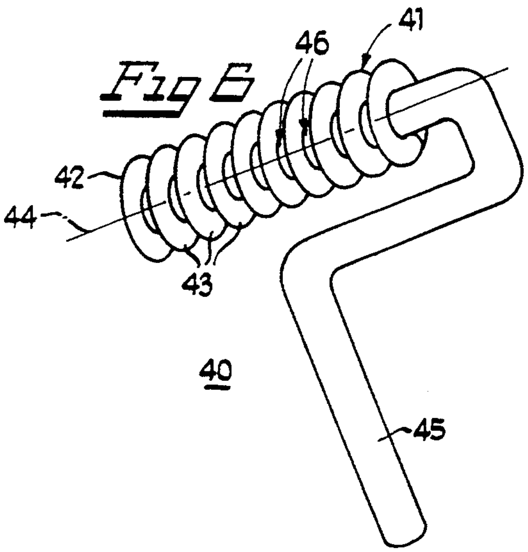
FIG. 6 is a perspective view of an alternative embodiment of the tool of the present invention.

Referring to FIG. 6, there is illustrated an alternative form of the tool of the present invention, generally designated by the numeral 40. The tool 40 is in the form of a helical coil 41 of a wire 42 defining a plurality of convolutions 43 having a longitudinal axis 44. Preferably, the helix angle of the coil 41 approximates the helix angle of the spring 10 which is to be serviced. The coil 41 is preferably in the form of a compression spring, having predetermined spaces 46 between the convolutions 43, with the spaces 46 having a width at least as great as the thickness T of the spring wire 11 which is to be serviced. A handle 45 is fixedly secured, as by welding, to one or both ends of the coil 41. In use, the convolutions 43 are inserted in the spaces 15 between the convolutions 12 of the extended spring 10, in the same manner as was described above with respect to the tool 20.

From the foregoing, it can be seen that there has been provided an improved tool which is of simple and economical construction and can be simply and easily manually inserted between the convolutions of an axially extended helical spring to prevent contraction thereof.

We claim:

1. A tool for maintaining in an axially extended condition a helical spring including a wire of a predetermined thickness coiled into a plurality of convolutions with a predetermined helix angle, said tool comprising: a body including at least three blades substantially equidistantly spaced apart along an axis by a distance at least as great as the predetermined thickness of the spring wire, each of said blades terminating at a distal end and having a pair of opposed substantially parallel flat planar faces, each of said faces being chamfered at the distal end of the associated blade, each of said faces being inclined at substantially the predetermined helix angle with respect to a plane perpendicular to said axis, whereby said blades are disposable alternately between convolutions of the spring when it is in its axially extended condition to prevent contraction thereof.

2. The tool of claim 1, wherein said body comprises a solid block, said blades projecting from said block in the same direction.

3. The tool of claim 2, wherein said blades are unitary with said block in a one-piece construction.

4. The tool of claim 1, wherein each of said blades has a width approximately equal to the diameter of the associated spring.

5. The tool of claim 1 wherein each of said blades has a length from said block to said distal end and a width, with said width being substantially greater than said length.

6. The tool of claim 1, and further comprising a handle integral with said body and projecting therefrom in a direction substantially perpendicular to said axis.

7. A tool comprising: a body, and at least three substantially equidistantly spaced-apart blades integral with said body and projecting in the same direction therefrom, each of said blades having opposed substantially flat planar faces with the faces of all of said blades being substantially parallel with one another, the opposed faces of each blade being spaced apart by a pair of opposed substantially parallel side surfaces with each of said side surfaces being inclined at a predetermined non-orthogonal angle with respect to the planes of said faces.

8. The tool of claim 7, wherein said side surfaces of all of said blades along the same side thereof are substantially coplanar.

9. The tool of claim 7, wherein all of said blades have the same length.

10. The tool of claim 9, wherein each of said blades has a flat planar distal end surface, with the distal end surfaces of all of said blades being substantially coplanar.

11. The tool of claim 7, wherein each of said blades has the faces thereof chamfered adjacent at the distal end thereof.

12. The tool of claim 7, wherein said predetermined angle is in the range of from about 70° to about 85°.

13. The tool of claim 12, wherein said predetermined angle is substantially 81°.

* * * * *